(12) United States Patent
Avadhanula

(10) Patent No.: US 12,165,077 B2
(45) Date of Patent: Dec. 10, 2024

(54) METHOD AND SYSTEM FOR GENERATING MODEL DRIVEN APPLICATIONS USING ARTIFICIAL INTELLIGENCE

(71) Applicant: Tata Consultancy Services Limited, Mumbai (IN)

(72) Inventor: Yugesh Avadhanula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1141 days.

(21) Appl. No.: 17/004,660

(22) Filed: Aug. 27, 2020

(65) Prior Publication Data

US 2021/0103834 A1  Apr. 8, 2021

(30) Foreign Application Priority Data

Aug. 28, 2019  (IN) ............................ 201921034589

(51) Int. Cl.
G06N 5/04 (2023.01)
G06N 20/00 (2019.01)

(52) U.S. Cl.
CPC ............... G06N 5/04 (2013.01); G06N 20/00 (2019.01)

(58) Field of Classification Search
CPC ................. G06Q 10/06; G06Q 10/067; G06Q 10/06375; G06Q 10/087; G06Q 10/101;
(Continued)

(56) References Cited

U.S. PATENT DOCUMENTS 9,977,656 B1  5/2018  Mannopantar et al.
2014/0279808 A1* 9/2014 Strassner ............... G06Q 10/06
706/47
(Continued)

FOREIGN PATENT DOCUMENTS

CN  102033743 B  3/2013

OTHER PUBLICATIONS

Hadji, Hend Ben, and Ho-Jin Choi. "Towards contextual information based-approach to support software reuse system." 2009 11th International Conference on Advanced Communication Technology. vol. 1. IEEE, 2009:132-136 (Year: 2009).*
(Continued)

*Primary Examiner* — Randall K. Baldwin
(74) *Attorney, Agent, or Firm* — FINNEGAN, HENDERSON, FARABOW, GARRETT & DUNNER LLP

(57) ABSTRACT

The system and method of the present disclosure uses the artificial intelligence in the model driven framework to bring productivity benefits in the model driven application development. It comprises an easy to use user interface to share context-specific questions to a user and to capture their responses. The system performs its user interactions based on the user's responses and the output from the recommendation module which are based on application models, user interaction history and the system usage pattern. The system interprets user inputs as one or more actions to be executed with the help of usage patterns in the model database and executes them and performs error identification and recovery when required. The results of execution or error recovery along with recommendations for subsequent actions are communicated back to the user through recommendation module.

13 Claims, 4 Drawing Sheets

(58) Field of Classification Search
CPC .......... G06Q 10/04; G06N 5/04; G06N 20/00; G06F 11/07; G06F 11/079; G06F 11/0793; G06F 9/451; G06F 8/35
See application file for complete search history.

(56) References Cited

U.S. PATENT DOCUMENTS

| | | | | |
|---|---|---|---|---|
| 2015/0082277 | A1* | 3/2015 | Champlin-Scharff | G06F 11/3664 717/120 |
| 2016/0300144 | A1* | 10/2016 | Santhanam | G06N 20/00 |
| 2018/0024814 | A1* | 1/2018 | Ouali | G06F 8/10 717/105 |
| 2019/0213115 | A1* | 7/2019 | Takawale | G06F 11/3692 |
| 2019/0250891 | A1* | 8/2019 | Kumar | G06T 7/70 |
| 2020/0057612 | A1* | 2/2020 | Doyle | G06F 8/35 |

OTHER PUBLICATIONS

Knappmeyer, Michael, et al. "Survey of context provisioning middleware." IEEE Communications Surveys & Tutorials 15.3 (2013): 1492-1519. (Year: 2013).*

Friedrich, Fabian, Jan Mendling, and Frank Puhlmann. "Process model generation from natural language text." Advanced Information Systems Engineering: 23rd International Conference, CAiSE 2011, London, UK, Jun. 20-24, 2011. Proceedings 23. Springer Berlin Heidelberg, 2011: 482-496 (Year: 2011).*

Jordi Cabot et al., "Cognifying Model-Driven Software Engineering", Jan. 2018, ICREA, Universitat Oberta de Catalunya, Politecnico di Milano, and CEA List.

Aldazabal, Aitor, et al. "Automated model driven development processes." Proceedings of the ECMDA workshop on Model Driven Tool and Process Integration. Jan. 2008.

* cited by examiner

METHOD AND SYSTEM FOR GENERATING MODEL DRIVEN APPLICATIONS USING ARTIFICIAL INTELLIGENCE

CROSS-REFERENCE TO RELATED APPLICATIONS AND PRIORITY

This U.S. patent application claims priority under 35 U.S.C. § 119 to Indian Application No. 201921034589, filed on Aug. 28, 2019. The entire contents of the abovementioned application are incorporated herein by reference.

TECHNICAL FIELD

The disclosure herein generally relates to a field of generation of model driven applications, more particularly, a system and method for generating a model driven application using an intelligent approach to bring productivity benefits in the application development.

BACKGROUND

In a software development organization, various software developers develop source code and software components for implementing various types of functionality and software applications. Model driven application development generates technology specific code from technology independent models. A model-driven development framework provides different types of actions on models including create model elements, modify them, validate models, link model elements, generate code from models, etc. The model driven framework enables faster implementation of new software applications and is a step forward towards rapid application development.

Existing model driven platforms lack capabilities such as aggregation and execution of aggregated actions, storage and reuse of aggregated actions as patterns, and reuse of knowledge generated from the action executions and usage history and usage of artificial intelligence to interact with the users which are all novel capabilities in the proposed system. Existing systems do not possess the components associated with the aforementioned capabilities either partially or fully.

These include but are not limited to query/response database, component-action usage patterns and model templates to recommend actions based on the user requirement.

SUMMARY

Embodiments of the present disclosure provide technological improvements as solutions to one or more of the above-mentioned technical problems recognized by the inventors in conventional systems. For example, in one embodiment, a method and system for optimizing a plurality of validations carried out for input data at a data warehouse is provided.

A processor-implemented method to generate a model driven development framework using an artificial intelligence is provided. The method uses the artificial intelligence in the model driven framework to bring productivity benefits in the model driven application development. The method comprises one or more steps including collecting one more inputs from a user at a user interface of the system, interpreting the collected one or more inputs at an action interpreter module to identify one or more actions and one or more targets using artificial intelligence of the system, wherein a mapping between each identified one or more actions and corresponding one identified target is identified using the artificial intelligence of the system.

Further, the method comprises executing each of the one or more identified actions on each of the one or more identified targets based on each action's definition, identifying one or more errors at an error identification module during the execution of the identified one or more actions, wherein the system is configured to locate root cause of the identified error, recovering the identified one or more errors at an error recovery module based on one or more predefined parameters, and recommending one or more actions at a recommendation engine module for one or more targets or respond to one or more collected user-inputs. It is to be noted that these responses and recommendations are based on the previously executed one or more actions, the error identification and recovery, the one or more user inputs, user-notifications or intelligence obtained by analyzing the predefined information in the model storage.

A system is configured for generating a model driven framework using an artificial intelligence. The system uses the artificial intelligence in the model driven framework to bring productivity benefits in the model driven application development. The system comprises at least one memory, at least one user interface, one or more hardware processors communicatively coupled with the at least one memory, wherein the one or more hardware processors are configured to execute one or more modules. It is to be noted that the user interface is configured to collect one or more inputs from a user.

Further the system comprises an action interpreter module performing language processing to interpret the collected one or more inputs, to identify one or more actions and one or more targets and the mapping between each identified one or more actions and corresponding one identified targets. An action executor module of the system is configured to execute each identified one or more actions on targets based on action's definition, and an error identification module is configured to identify one or more errors during the execution of the identified one or more actions. It is to be noted that the system is configured to locate root cause of the identified error.

Furthermore, the system comprises an error recovery module configured to recover the identified one or more errors based on one or more predefined parameters, and a recommendation engine module configured to recommend one or more actions for one or more targets or respond to one or more collected user-inputs. It would be appreciated that these responses and recommendations are based on the previously executed one or more actions, the error identification and recovery, the one or more user inputs, user-notifications or intelligence obtained by analyzing the predefined information in the model storage.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
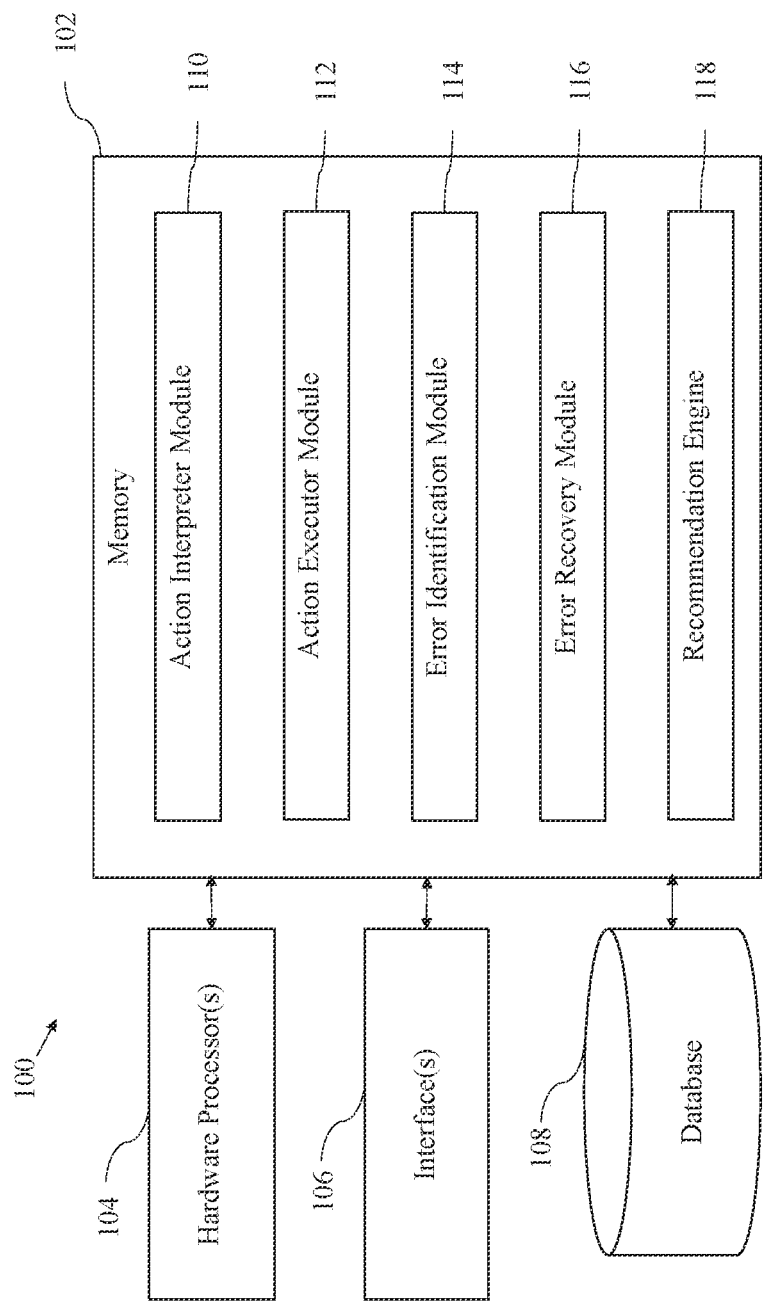
FIG. 1 illustrates a block diagram of a system for generating a model driven application using an artificial intelligence, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a system and method to generate a model driven application using an artificial intelligence. It would be appreciated that the method uses the artificial intelligence in the model driven framework to bring productivity benefits in the model driven application development.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Referring FIG. 1, wherein the system (100) comprises as least one memory (102) with a plurality of instructions and one or more hardware processors (104) which are communicatively coupled with the at least one memory (102) to execute modules therein. Further, the system comprises at least one user interface (106) and a model database (108), wherein the user interface (106) is configured to collect one or more inputs from a user. Furthermore, the system (100) comprises an action interpreter module (110), an action executor module (112), an error identification module (114), an error recovery module (116), and a recommendation engine (118).

Figure 2:
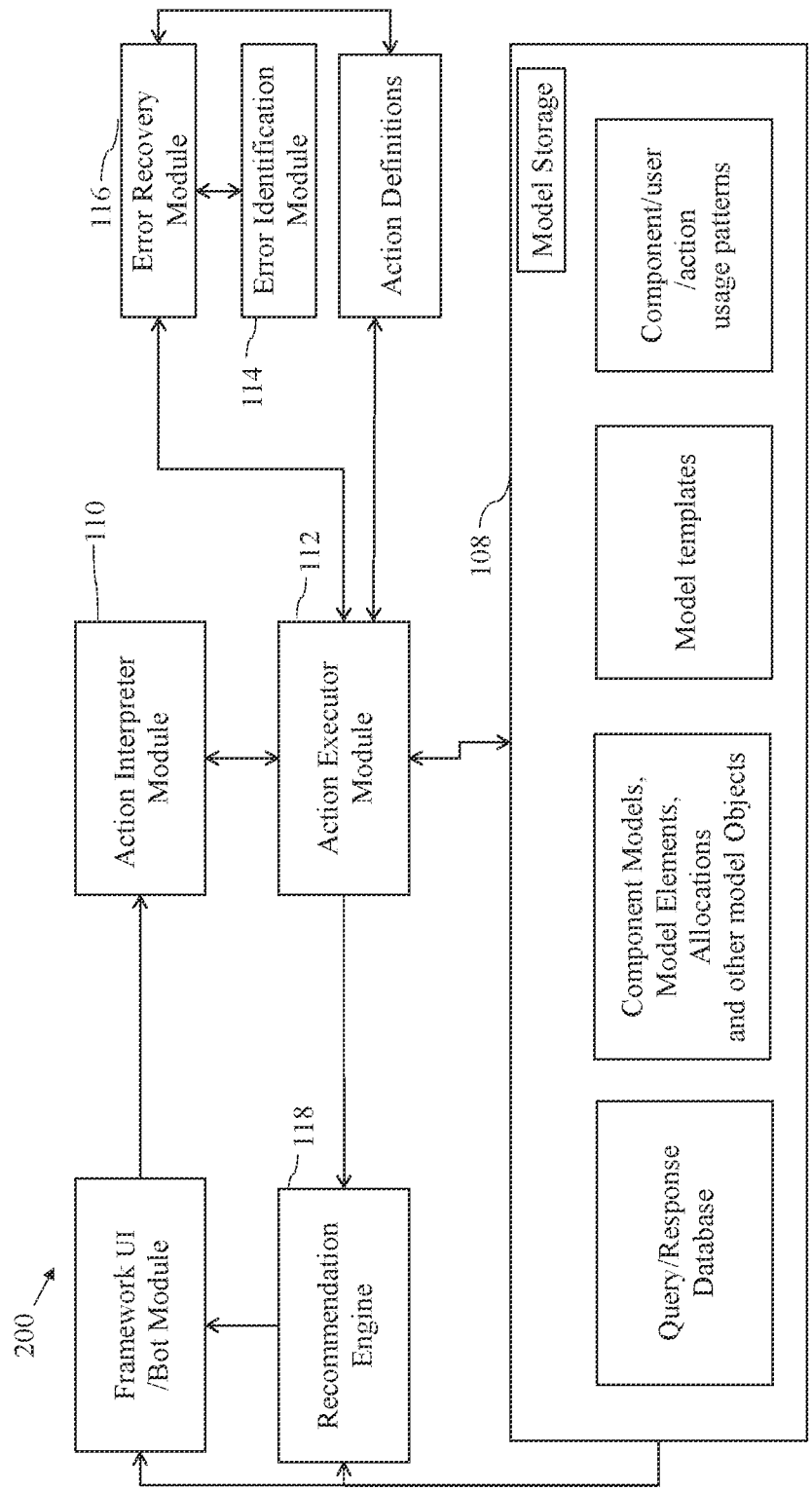
FIG. 2 is a schematic diagram to generate a model driven application using an artificial intelligence, in accordance with some embodiments of the present disclosure.

Referring FIG. 2, a schematic diagram, wherein the system (200) is configured to generate a model driven framework using an artificial intelligence. It should be appreciated that the system (200) is configured to utilize artificial intelligence technique in the model driven development framework to bring productivity benefits in the application development. It would be appreciated that a model storage unit comprises one or more application models, common reusable model templates, and query/response database and component user action usage patterns. These model templates, query/response database and component user action usage patterns are provided with pre-defined knowledge and updated with new components and actions with time upon usage of the framework.

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102).

In the preferred embodiment of the disclosure, the user interface (106) of the system (100) is configured to collect input data. The collected input data comprising a context-specific questions to the users through the user interface and captures their responses. Further, the model database (108) of the system is a model storage unit comprises one or more application models, common reusable model templates, and query/response database and component user action usage patterns. These model templates, query/response database and component user action usage patterns are provided with pre-defined knowledge and updated with new components and actions with time upon usage of the framework.

In the preferred embodiment of the disclosure, the action interpreter module (110) of the system (100) is configured to perform language processing to interpret the collected one or more inputs. Further, the action interpreter module (110) is used to identify one or more actions and one or more targets and the mapping between each identified one or more actions and corresponding one identified target. Herein, the one or more targets includes component models, model elements, allocation objects of model elements to user objects in the system, work-space.

In the preferred embodiment of the disclosure, the action executor module (112) of the system (200) is configured to execute each identified one or more actions on targets based on an action's definition. It is to be noted that the one or more actions create a model element like a class, manipulate a model element, validate a model element, create a business component in the model, and configure technology options for a component. Further, the one or more targets include but are not limited to component models, model elements, allocation objects of model elements to user objects in the system, workspace. The action definitions represent executable instructions present inside the model driven development framework in one or more technologies to run the actions on the targets.

It would be appreciated that a plurality of model templates and a plurality of usage pattern are provided with a predefined knowledge. The plurality of model templates is created with time and upon usage of the model driven platform, further wherein the plurality of model templates is enhanced with new or existing model elements with time and upon usage of the model driven platform.

In the preferred embodiment of the disclosure, the error identification module (114) of the system (100) is configured to identify one or more errors during the execution of the identified one or more actions. It is to be noted that the system is configured to locate root cause of the identified error.

In the preferred embodiment of the disclosure, the error recovery module (116) of the system (100) is configured to recover the identified one or more errors based on one or more predefined parameters. When an error occurs at any time during the execution of an action, based on the action, the target, and the system state, one or more recovery functions are identified and they are executed to rectify the system state. The recovery function invocations are implemented as a part of action definitions themselves. Recovery functions are also actions within the model driven development framework.

In the preferred embodiment of the disclosure, the recommendation engine (118) of the system (200) is configured to recommend one or more actions for one or more targets or respond to one or more collected user-inputs. It would be appreciated that these responses and recommendations are based on the previously executed one or more actions, the error identification and recovery, the one or more user inputs, user-notifications or intelligence obtained by analyzing the predefined information in the model storage. It is to be noted that the action executor module responds back to the recommendation engine to prompt the user for any required information, when an action requires any input to proceed further or when an action or a sequence of actions specified by the user is in-feasible or when the user specifies an illegal action or a set of actions.

Figure 3:
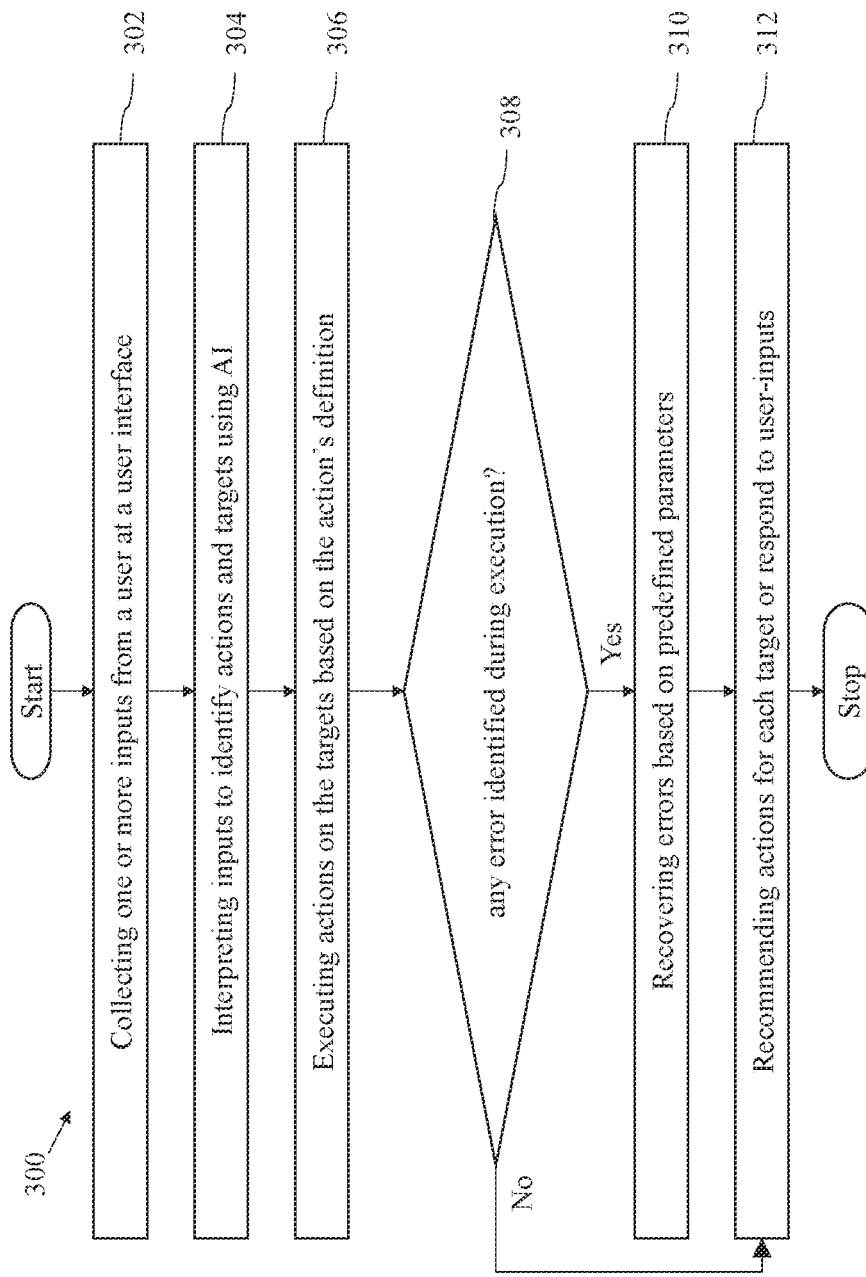
FIG. 3 illustrate a flow diagram of a method to generate a model driven application using an artificial intelligence, in accordance with some embodiments of the present disclosure.

Referring to FIG. 3, a flowchart (300) shows a processor-implemented method (300) to generate a model driven framework using an artificial intelligence. It should be appreciated that an artificial intelligence technique is used in the model driven development framework to bring productivity benefits in the application development. The method comprises one or more steps as follows.

Initially, at the step (302), input data is collected via at least one user interface (106) of the system (100). It is to be noted that the collected input data comprising a context-specific questions to the users through the user interface and captures their responses.

In the preferred embodiment of the disclosure, at the next step (304), the collected one or more inputs are interpreted at the action interpreter module (110) of the system (100), to identify one or more actions, one or more targets, and the mapping between each of the identified one or more actions and corresponding one or more identified targets. In the action interpreter, user's input is compared with the text tagged to usage patterns stored in the model database and any full or partial matches are obtained by performing language processing. In case of a full match, the actions tagged to the closest matches are directly executed and the results are notified to the user. In case of a partial match or no match, the system uses artificial intelligence to recognize the possible actions from user inputs and prompts back to the user for confirmation.

In the preferred embodiment of the disclosure, at the next step (306), each of the one or more identified actions on each of the one or more identified targets at the action executor module (112) of the system (100) are executed to carry out the required operations in the model driven framework.

In the preferred embodiment of the disclosure, at the next step (308), one or more errors at the error identification module (114) of the system (100) during the execution of the identified one or more actions are identified. It is to be noted that the system is configured to locate root cause of the identified error. An example error can be the model database getting disconnected while model validation action is in progress. The error identification module detects the failure of the model validation action. Based on the type of error encountered, the module identifies it as a problem with model database.

In the preferred embodiment of the disclosure, at the next step (310), the identified one or more errors are recovered at the error recovery module (116) of the system (100) based on one or more predefined parameters such as the action being executed, the targets on which action is executed and the type of error occurred. For the example mentioned in the paragraph [032] the error recovery module recognizes database connectivity as the root cause and attempts to reestablish a connection with the model database for a predefined number of times. Since the model validation action does not update the model database, if connectivity is successful, the action is re-executed and the results are notified to the user. If connectivity with the database is not established for after the predefined number of connection attempts, the error recovery module notifies the error to the user recommending the user to check the network and the database settings and provides links to open these settings in the framework.

Figure 4:
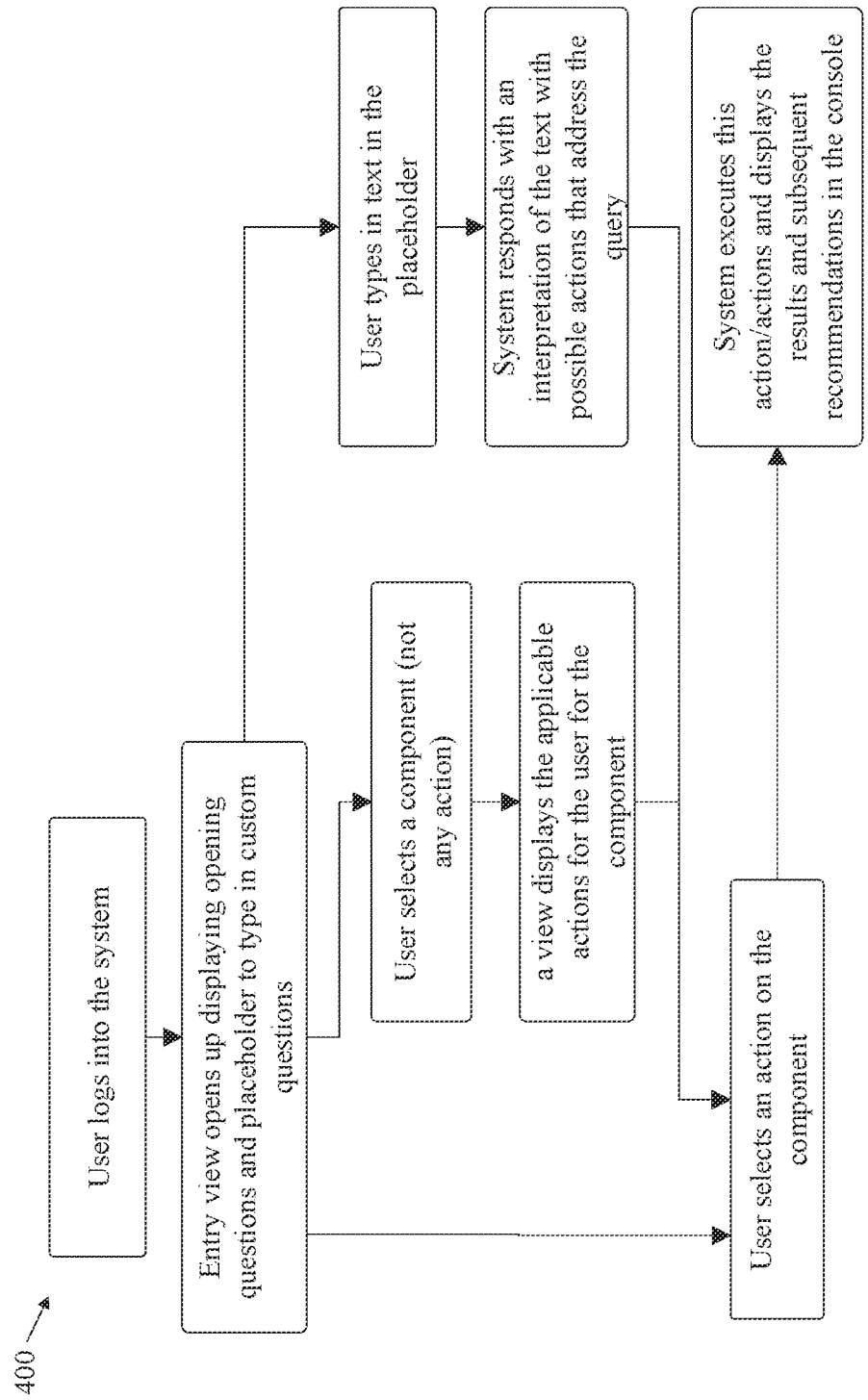
FIG. 4 is an exemplary flow chart to show a model driven application generation using an artificial intelligence, in accordance with some embodiments of the present disclosure.

Referring FIG. 4, an exemplary flow chart (400), wherein a user is logging into the model driven framework through a framework user interface. A set of questions and text space would be displayed based on the current context-specific and one or more recommendations by the system. Further, the system captures one or more responses from the user and interprets the responses by the action interpreter module of the system. Execution of actions by the action executor module is based on the action interpretation and action definitions. A code will be generated based on the actions execution by the system. In case of any error during the action execution, the system attempts to identify the root cause of the error by performing some diagnostic actions. Based on the outcome of these diagnostics, the system will attempt corrective action or prompt the user to execute any corrective actions to rectify the root cause.

In the preferred embodiment of the disclosure, at the last step (312), one or more actions at the recommendation engine (118) of the system (200) for one or more targets are recommended or one or more collected user-inputs are responded to. These responses and recommendations are based on the previously executed one or more actions, the error identification and recovery, the one or more user inputs, user-notifications or intelligence obtained by analyzing the predefined information in the model storage.

In one example, wherein when the user logs into the model driven framework for the first time, recommendations could include creation of a component from scratch or based on existing components, model a class, model or validate an existing component and so on. Once a certain action specified by the user completes execution, response to the user includes the results of the action together with recommendations to run the next possible actions on the same component, any global configurations to be updated and so on. Once a user logs into the framework after the first time, the initial recommendations include subsequent actions to be performed on the component on which the user previously acted on before logging off.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem associated with traditional model driven development framework by leveraging artificial intelligence techniques. Existing system lacks capabilities such as aggregation and execution of aggregated actions, storage and reuse of aggregated actions as patterns, and reuse of knowledge generated from the action executions and usage history and usage of artificial intelligence to interact with the users which are all novel capabilities in the proposed system. Existing system does not possess the components associated with the aforementioned capabilities either partially or fully. These include but not limited to query/response database, component-action usage patterns and model templates to recommend actions based on the user requirement.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system (100) comprising:
   at least one memory (102) storing a plurality of instructions;
   at least one user interface (106), wherein the user interface is configured to collect one or more inputs from a user; and
   at least one model database (108) to store one or more pre-trained models; one or more hardware processors (104) communicatively coupled with the at least one memory (102), wherein the one or more hardware processors (104) are configured to:
   perform language processing to interpret the collected one or more inputs, to identify one or more actions, one or more targets and mapping between each identified one or more actions and corresponding one or more identified targets, wherein the one or more inputs are compared with a text tagged to usage patterns stored in the model database and full or partial matches are obtained by performing language processing, wherein for full match, the one or more actions tagged to the closest matches are executed and results are notified to the user and for partial match or no match, possible actions are recognized using artificial intelligence from the one or more inputs and the user is prompted for confirmation;
   execute each identified one or more actions on one or more identified targets based on each action's definition, wherein the one or more actions create a model element, manipulate a model element, validate a model element, create a business component in the one or more pre-trained models, and configure technology options for the component,
   identify one or more errors during the execution of the identified one or more actions, wherein a root cause of the identified error is located and wherein the model database connectivity is recognized as the root cause and a connection is reestablished with the model database for a predefined number of times and the one or more actions are re-executed when the connection is successful and results are notified to the user;
   recover the identified one or more errors based on one or more predefined parameters, wherein one or more recovery functions are identified and executed to recover the identified one or more errors based on the one or more predefined parameters, wherein the one or more recovery functions invocations are implemented as a part of the each action's definition, and wherein the one or more predefined parameters include the one or more actions being executed, the one or more targets on which the one or more actions being executed and type of the one or more errors that occurred; and recommend one or more actions for one or more targets or respond to one or more collected user-inputs, wherein the one or more recommended actions are based on the previously executed one or more actions, the error identification and recovery, the one or more user inputs, user-notifications, usage history, or a plurality of model templates and a plurality of usage patterns provided with predefined knowledge.

2. The system (100) of claim 1, wherein the plurality of model templates and the plurality of usage patterns are created at a time and upon usage of the model driven platform.

3. The method (100) of claim 1, wherein the plurality of model templates and the plurality of usage patterns are enhanced with new or existing model elements and usage pattern entries respectively at a time and upon usage of the model driven platform.

4. The system (100) of claim 1, wherein each action definition represents executable instructions present inside a model driven development framework in one or more technologies to run the actions on the targets.

5. The system (100) of claim 1, wherein the one or more targets include component models, model elements, and allocation objects of model elements to user objects in the system, or a workspace.

6. The system (100) of claim 1, wherein recommendation of the one or more recommended actions includes prompting the user for any required information, when an action requires any inputs to proceed further or when an action or a sequence of actions specified by the user is in-feasible or when the user specifies an illegal action or a set of actions or when the system recovered from an error.

7. The system (100) of claim 1, wherein the one or more recommended actions are performed according to a context and requirement.

8. A processor-implemented method (300) comprising:
collecting (302), via one or more hardware processors, one more inputs from a user at a user interface (106) of a system (100);
interpreting (304), via the one or more hardware processors, the collected one or more inputs by performing language processing to identify one or more actions and one or more targets, wherein mapping is identified between each identified one or more actions and corresponding one identified targets, wherein the one or more inputs are compared with a text tagged to usage patterns stored in the model database and full or partial matches are obtained by performing language processing, wherein for full match, the one or more actions tagged to the closest matches are executed and results are notified to the user and for partial match or no match, possible actions are recognized using artificial intelligence from the one or more inputs and the user is prompted for confirmation;
executing (306), via the one or more hardware processors, each of the one or more identified actions on each of the one or more identified targets based on each action's definition, wherein the one or more actions comprising creating a model element, manipulating a model element, validating a model element, creating a business component in the one or more pre-trained model, and configuring technology options for the component;
identifying (308), via the one or more hardware processors, one or more errors during the execution of the identified one or more actions, wherein a root cause of the identified error is located and wherein the model database connectivity is recognized as the root cause and a connection is reestablished with the model database for a predefined number of times and the one or more actions are re-executed when the connection is successful and results are notified to the user;
recovering (310), via the one or more hardware processors, the identified one or more errors based on one or more predefined parameters, wherein one or more recovery functions are identified and executed to recover the identified one or more errors based on the one or more predefined parameters, wherein the one or more recovery functions invocations are implemented as a part of the each action's definition, and wherein the one or more predefined parameters include the one or more actions being executed, the one or more targets on which the one or more actions being executed and type of the one or more errors that occurred; and
recommending (312), via the one or more hardware processors, one or more actions for each of the one or more targets or respond to one or more collected user-inputs, wherein the one or more recommended actions are based on the previously executed one or more actions, the error identification and recovery, the one or more user inputs, user-notifications, usage history, or a plurality of model templates and a plurality of usage patterns provided with predefined knowledge.

9. The method (300) of claim 8, further comprising:
creating, via the one or more hardware processors, one or more model templates and a plurality of usage patterns at a time and upon usage of the model driven platform.

10. The method (300) of claim 9, wherein one or more model templates and the plurality of usage patterns are enhanced with new or existing model elements and usage pattern entries respectively at a time and upon usage of the model driven platform.

11. The method (300) of claim 8, wherein each action definition represents executable instructions present inside a model driven development framework in one or more technologies to run each of the one or more actions on the one or more targets.

12. The method (300) of claim 8, wherein the one or more targets include component models, model elements, and allocation objects of model elements to user objects in the system, or a workspace.

13. The method (300) of claim 8, wherein recommendation of the one or more recommended actions includes prompting the user for any required information, when an action requires any input to proceed further or when an action or a sequence of actions specified by the user is infeasible or when the user specifies an illegal action or a set of actions or when the error is recovered.

* * * * *